US012755042B2

(12) United States Patent
Yamaguchi et al.

(10) Patent No.: US 12,755,042 B2
(45) Date of Patent: Oct. 6, 2026

(54) AUTHENTICATION SYSTEM AND RELAY DEVICE

(71) Applicant: DENSO CORPORATION, Kariya-city (JP)

(72) Inventors: Hideyuki Yamaguchi, Kariya-city (JP); Hideyuki Honya, Kariya-city (JP); Satoshi Niwa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 156 days.

(21) Appl. No.: 18/789,411

(22) Filed: Jul. 30, 2024

(65) Prior Publication Data

US 2024/0394396 A1 Nov. 28, 2024

Related U.S. Application Data

(63) Continuation of application No. PCT/JP2023/010735, filed on Mar. 17, 2023.

(30) Foreign Application Priority Data

Mar. 31, 2022 (JP) ................................ 2022-059057

(51) Int. Cl.
*G06F 21/62* (2013.01)

(52) U.S. Cl.
CPC ................................ *G06F 21/6218* (2013.01)

(58) Field of Classification Search
CPC ............................ G06F 21/6218; G06F 21/62
See application file for complete search history.

(56) References Cited

U.S. PATENT DOCUMENTS

| | | | | |
|---|---|---|---|---|
| 2010/0097201 | A1 * | 4/2010 | Mahalingaiah | G06Q 50/40 340/438 |
| 2014/0123240 | A1 | 5/2014 | Seo et al. | |
| 2019/0294130 | A1 | 9/2019 | von Haugwitz | |
| 2023/0376575 | A1 | 11/2023 | Anzai et al. | |
| 2025/0181773 | A1 * | 6/2025 | Honya | G06F 21/629 |

FOREIGN PATENT DOCUMENTS

| | | | | |
|---|---|---|---|---|
| JP | 2005267513 | A | 9/2005 | |
| JP | 2007090951 | A | 4/2007 | |
| JP | 6056384 | B2 | 1/2017 | |
| JP | 2017151942 | A * | 8/2017 | |
| JP | 2018136792 | A | 8/2018 | |
| JP | 2019169151 | A | 10/2019 | |
| JP | 6683644 | B2 | 4/2020 | |
| JP | 2020113065 | A * | 7/2020 | |
| JP | 6740436 | B1 | 8/2020 | |
| JP | 6800054 | B2 | 12/2020 | |
| WO | WO-2022172578 | A1 * | 8/2022 | G06F 21/52 |

* cited by examiner

*Primary Examiner* — Han Yang
(74) *Attorney, Agent, or Firm* — Harness, Dickey & Pierce, P.L.C.

(57) ABSTRACT

An authentication system or a relay device includes: at least one service application configured to utilize vehicle information; a service manager configured to acquire the vehicle information stored in an electronic control unit; at least one service bus configured to manage transmission and reception of data between the at least one service application and the service manager; and an authorization confirmation unit configured to confirm whether to authorize a vehicle information acquisition request of the confidential information. The authorization confirmation unit is installed in the at least one service bus or in the service manager.

13 Claims, 11 Drawing Sheets

AUTHENTICATION SYSTEM AND RELAY DEVICE

CROSS REFERENCE TO RELATED APPLICATIONS

The present application is a continuation application of International Patent Application No. PCT/JP2023/010735 filed on Mar. 17, 2023, which designated the U.S. and claims the benefit of priority from Japanese Patent Application No. 2022-059057 filed on Mar. 31, 2022. The entire disclosures of all of the above applications are incorporated herein by reference.

TECHNICAL FIELD

The present disclosure relates to an authentication system and a relay device.

BACKGROUND

In a comparative example, an in-vehicle device includes a plurality of applications configured to provide predetermined services to a vehicle driver, and a plurality of managers configured to hand over vehicle information to the plurality of applications in response to information acquisition requests from the plurality of applications.

SUMMARY

An authentication system or a relay device includes: at least one service application configured to utilize vehicle information; a service manager configured to acquire the vehicle information stored in an electronic control unit; at least one service bus configured to manage transmission and reception of data between the at least one service application and the service manager; and an authorization confirmation unit configured to confirm whether to authorize a vehicle information acquisition request of the confidential information. The authorization confirmation unit is installed in the at least one service bus or in the service manager.

DETAILED DESCRIPTION

Figure 1:
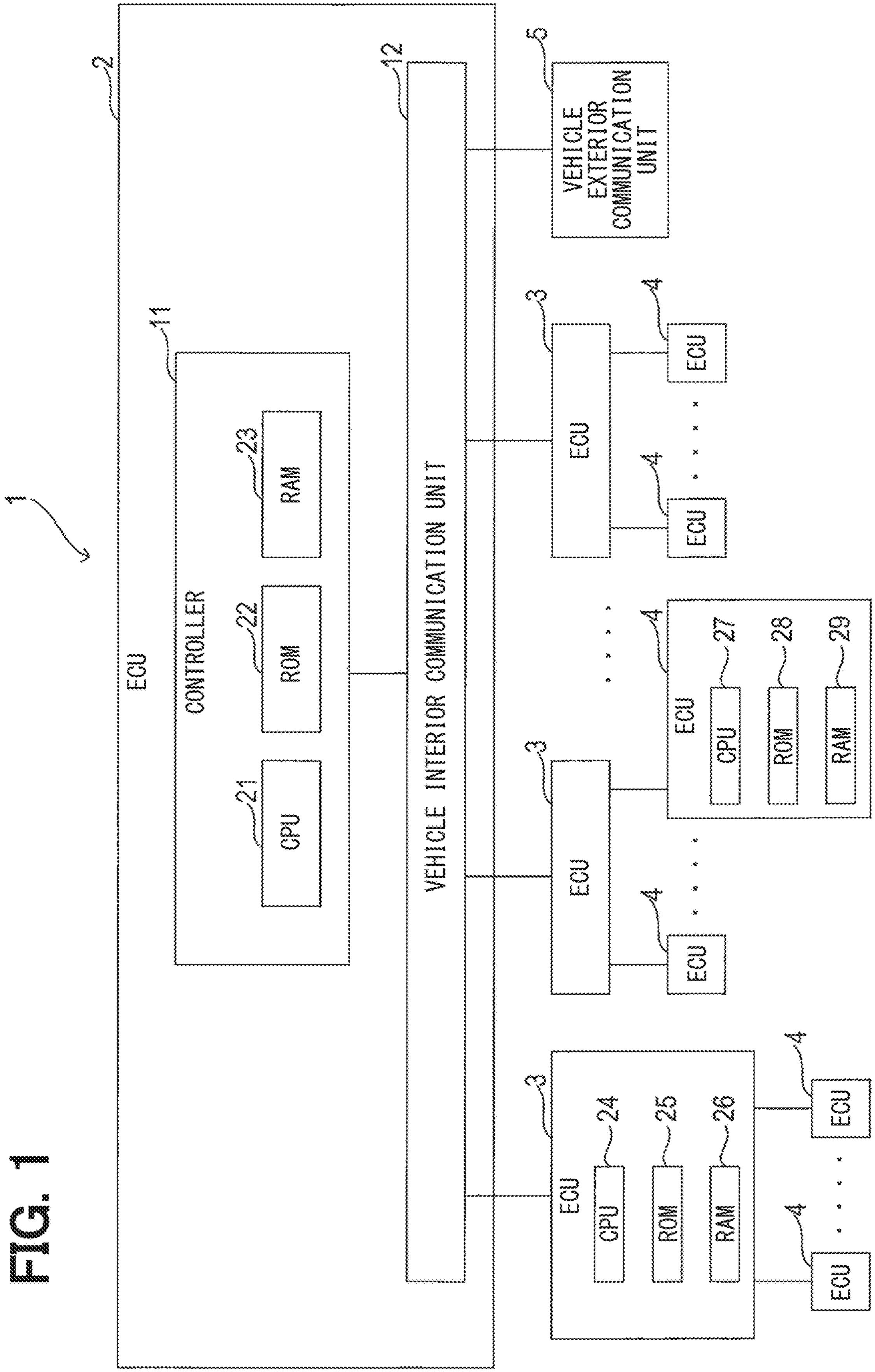
FIG. 1 is a block diagram showing a configuration of a vehicle control system.

As a result of detailed consideration by the inventors, it was found that in a system comprising the above-described applications and the above-described managers, there is a difficulty that the managers may provide vehicle information to the applications in response to an information acquisition request from the application even when the information should not be provided to the applications.

Examples of the present disclosure improve a security level in providing information.

According to an example of the present disclosure, an authentication system includes at least one service application, a service manager, at least one service bus, and an authorization confirmation unit.

The at least one service application utilizes vehicle information related to the vehicle to provide services to the vehicle.

The service manager acquires the vehicle information stored in an electronic control unit of the vehicle.

The at least one service bus manages transmission and reception of data between the at least one service application and the service manager.

When the at least one service application makes a vehicle information acquisition request that requests provision of confidential information among the vehicle information, the authorization confirmation unit confirms whether to authorize the vehicle information acquisition request of the confidential information based on whether a user has consented.

The authorization confirmation unit is installed in the at least one service bus or in the service manager.

In the authentication system of the present disclosure configured in such a manner, the authorization confirmation unit is installed in the at least one service bus or in the service manager. Therefore, the authentication system of the present disclosure can determine whether to provide vehicle information in response to the vehicle information acquisition request made by the service application. As a result, the authentication system of the present disclosure can prevent the occurrence of a situation in which vehicle information that should not be provided to the service application is provided to the service application. It is possible to improve a security level in providing information.

According to another example of the present disclosure, a relay device relays data transmitted from an electronic control unit to a communication network of a vehicle, and includes at least one service application, a service manager, at least one service bus, and an authorization confirmation unit.

The at least one service application utilizes vehicle information related to the vehicle to provide services to the vehicle.

The service manager acquires the vehicle information stored in a first storage of the relay device or a second storage of the electronic control unit.

The at least one service bus manages transmission and reception of data between the at least one service application and the service manager.

When the at least one service application makes a vehicle information acquisition request that requests provision of confidential information among the vehicle information stored in the second storage of the electronic control unit or the first storage of the relay device, the authorization confirmation unit confirms whether to authorize the vehicle information acquisition request of the confidential information based on whether a user has consented.

The authorization confirmation unit is installed in the at least one service bus or in the service manager.

The relay device of the present disclosure configured in this manner is a device that constitutes the authentication system of the present disclosure, and is possible to acquire the same effects as the authentication system of the present disclosure.

First Embodiment

Hereinafter, a first embodiment according to the present disclosure will be described with reference to the drawings.

A vehicle control system 1 of the present embodiment is mounted on a vehicle. The vehicle may have an automated driving function in addition to a manual driving function. The vehicle may be a hybrid vehicle having an engine and an electric motor as a traveling source. The vehicle is not limited to the vehicle having the automated driving function or the hybrid vehicle, but may be a vehicle having only a manual driving function, or a vehicle having only an engine or only an electric motor as the traveling source. Hereinafter, the vehicle equipped with the vehicle control system 1 will be simply referred to as a vehicle.

As shown in FIG. 1, the vehicle control system 1 includes one ECU 2 and a plurality of ECUs 3. The ECU is an abbreviation for Electronic Control Unit.

The ECU 2 controls the plurality of ECUs 3 to achieve coordinated control of the entire vehicle.

The ECU 3 is provided for each domain divided by function in the vehicle, and mainly controls a plurality of ECUs 4 existing within that domain. The domain is, for example, a powertrain, a body, a chassis, or the like.

An ECU 3 belonging to the power train domain is connected to, for example, an ECU 4 that controls the engine, an ECU 4 that controls a motor, an ECU 4 that controls a battery, and the like.

An ECU 3 belonging to the body domain is connected to, for example, an ECU 4 that controls an air conditioner, an ECU 4 that controls doors, and the like.

An ECU 3 belonging to the chassis domain is connected, for example, an ECU 4 that controls the brakes, and an ECU 4 that controls the steering.

The ECU 3 is an electronic control unit mainly including a microcomputer including a CPU 24, a ROM 25, a RAM 26, and the like.

The ECU 4 is an electronic control unit mainly including a microcomputer including a CPU 27, a ROM 28, a RAM 29, and the like.

The ECU 2 includes a controller 11 and a vehicle interior communication unit 12.

The controller 11 is an electronic control unit mainly including a microcomputer with a CPU 21, a ROM 22, a RAM 23, and the like. Various functions of the microcomputer are implemented by the CPU 21 executing a program stored in a non-transitory tangible storage medium. In this example, the ROM 22 corresponds to the non-transitory tangible storage medium in which the program is stored. A method corresponding to the program is executed by executing the program. A part or all of the functions to be executed by the CPU 21 may be configured in hardware by one or multiple ICs or the like. The number of microcomputers included in the controller 11 may be one or more.

The vehicle interior communication unit 12 is connected to the plurality of ECUs 3 via a CAN or Ethernet, and performs data communication with the plurality of ECUs 3. The CAN is an abbreviation for Controller Area Network. The CAN is a registered trademark. The Ethernet is a registered trademark.

The vehicle control system 1 further includes a vehicle exterior communication device 5. The vehicle exterior communication device 5 performs data communication with a communication device outside the vehicle via a wide area wireless communication network. The vehicle exterior communication device 5 is an electronic control unit mainly having a microcomputer including a CPU, ROM, RAM, and the like. The ECU 2 performs data communication with the vehicle exterior communication device 5 via the vehicle interior communication unit 12.

Figure 2:
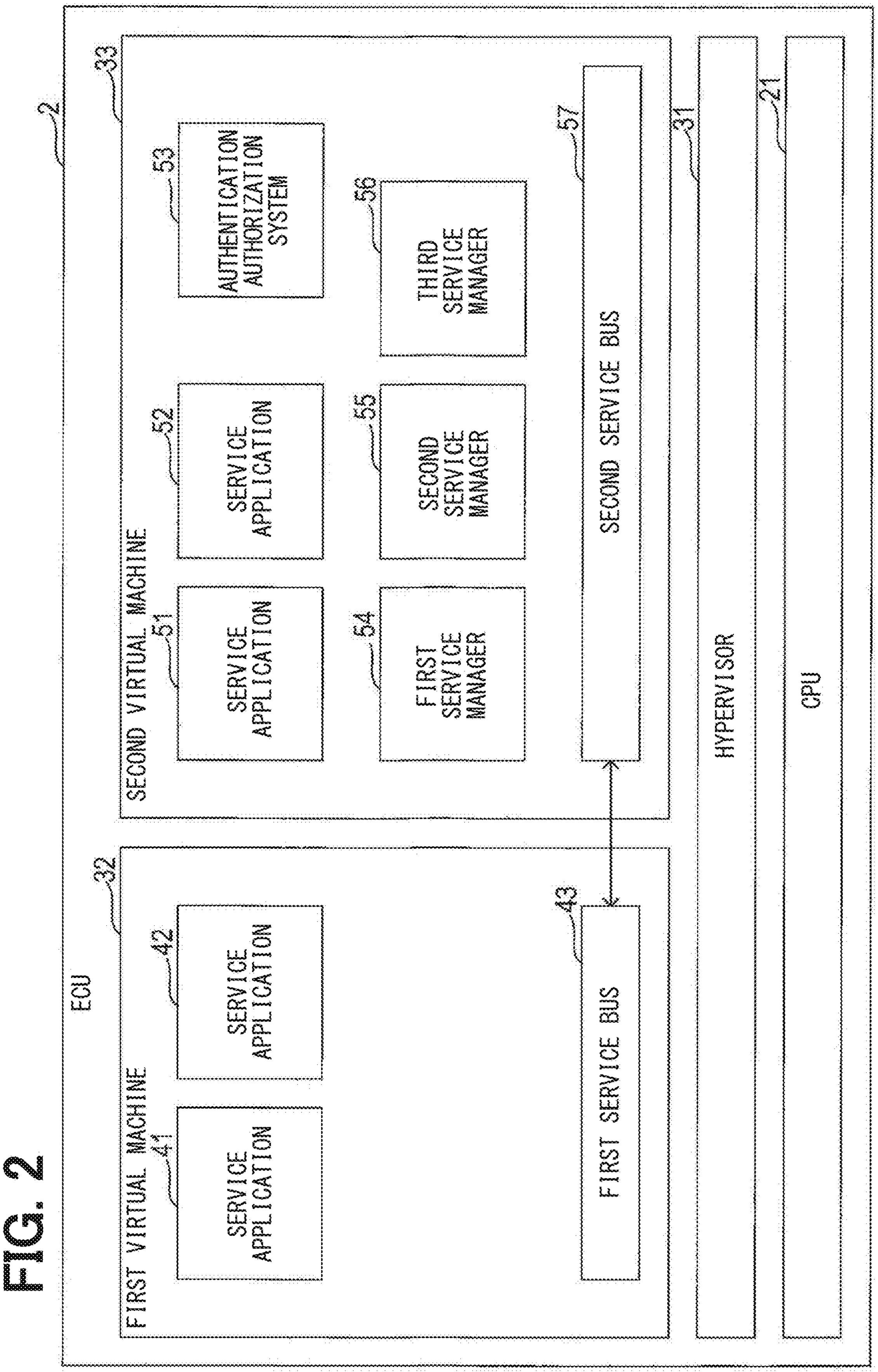
FIG. 2 is a functional block diagram showing a functional configuration of an ECU.

As shown in FIG. 2, the ECU 2 includes a hypervisor 31, a first virtual machine 32, and a second virtual machine 33.

The hypervisor 31 has a function of managing the first virtual machine 32 and the second virtual machine 33 so that the first virtual machine 32 and the second virtual machine 33 can be executed in parallel on the CPU 21.

The first virtual machine 32 includes a service application 41, a service application 42, and a first service bus 43 as functional blocks realized by the CPU 21 executing a program stored in the ROM 22.

The service applications 41, 42 are low-reliability applications produced under a process in which privacy protection cannot be guaranteed, for example, applications produced by a third party to provide services to vehicle users. The third party is any party other than a vehicle owner and an OEM. The third party includes, for example, data utilization companies that provide services by collecting data from vehicles. The OEM is the vehicle manufacturer that produced the vehicle. The OEM is an abbreviation for original equipment manufacturer.

Services provided to vehicle users include, for example, services that control the air conditioner to wake up the driver or control wipers to improve the driver's visibility in response to weather changes and the driver level of fatigue along a vehicle traveling schedule route. In the above service, for example, it is necessary to acquire, from inside, the vehicle information on the traveling schedule route, vehicle interior temperature information, vehicle exterior temperature information, current vehicle position information, driver age information, driver gender information, and driver body temperature information. Furthermore, the above service requires acquisition of rainy road information for the traveling schedule route from, for example, a social infrastructure platform outside the vehicle. Among the above information acquired from inside the vehicle, the vehicle current position information, the driver age information, gender information, and body temperature information correspond to privacy information.

The privacy information may be stored in the ECU 2, the ECU 3, or the ECU 4. For example, information indicating a home address of the vehicle owner may be stored in an ECU that controls a navigation device (i.e., any one of ECU2, ECU3, and ECU4). Furthermore, image data of a driver face image may be stored in the ECU that controls a driver status monitor (i.e., any one of ECU2, ECU3, and ECU4).

The service applications 41 and 42 provide different services to the vehicle user.

The first service bus 43 is an application that provides a messaging process that manages the exchange of messages (for example, API calls) between the service applications 41 and 42 and the outside of the first virtual machine 32. The API is an abbreviation for Application Programming Interface.

In the present embodiment, the first service bus 43 is, for example, an in-vehicle software platform that complies with AUTOSAR. The AUTOSAR is an abbreviation for Automotive Open System Architecture. The AUTOSAR is a registered trademark.

The second virtual machine 33 includes functional blocks implemented by the CPU 21 executing a program stored in the ROM 22, such as a service application 51, a service application 52, an authentication authorization system 53, a first service manager 54, a second service manager 55, a third service manager 56, and a second service bus 57.

The service applications 51 and 52 are high-reliability applications produced under a process that can guarantee privacy protection, for example, applications produced by the OEM to provide services to vehicle users.

The authentication authorization system 53 is an application that authenticates the vehicle user and authorizes access from the service applications 41 and 42 and the service applications 51 and 52.

The first, second, and third service managers 54, 55 and 56 are applications that collect vehicle information and control the vehicle in order to provide services to vehicle users. The first, second, and third service managers 54, 55, and 56 provide different services to the vehicle users.

The first, second and third service managers 54, 55, 56 are mounted on the ECU 2. Therefore, when the vehicle information that needs to be collected is stored in the ECU 2, the vehicle information can be acquired directly from the ECU 2. On the other hand, when the vehicle information to be collected is stored in the ECU 3 or 4, the first, second, and third service managers 54, 55, and 56 transmit an instruction to the ECU 3 or 4 to acquire the vehicle information via the vehicle communication network (i.e., CAN or Ethernet). In this way, vehicle information is acquired from the ECUs 3 and 4.

The vehicle information includes, for example, vehicle speed, engine speed, steering angle, acceleration, and position. The vehicle information is information stored in the ECU 4 that controls the engine, the ECU 4 that controls the steering, the ECU 4 that controls the airbags, and the vehicle exterior communication device 5.

The vehicle information may also include images captured by a vehicle interior camera and images captured by a vehicle exterior camera. The vehicle information is stored in the ECU 4 that controls the camera.

The vehicle information may also be an address registered in the navigation device. This address is information stored in a navigation device connected to the ECU 2.

The second service bus 57 is an application that provides messaging processing that manages the exchange of messages between the service applications 51 and 52 and the authentication authorization system 53 and the first, second, and third service managers 54, 55, and 56. In the present embodiment, the second service bus 57 is, for example, an in-vehicle software platform that complies with AUTOSAR.

Figure 3:
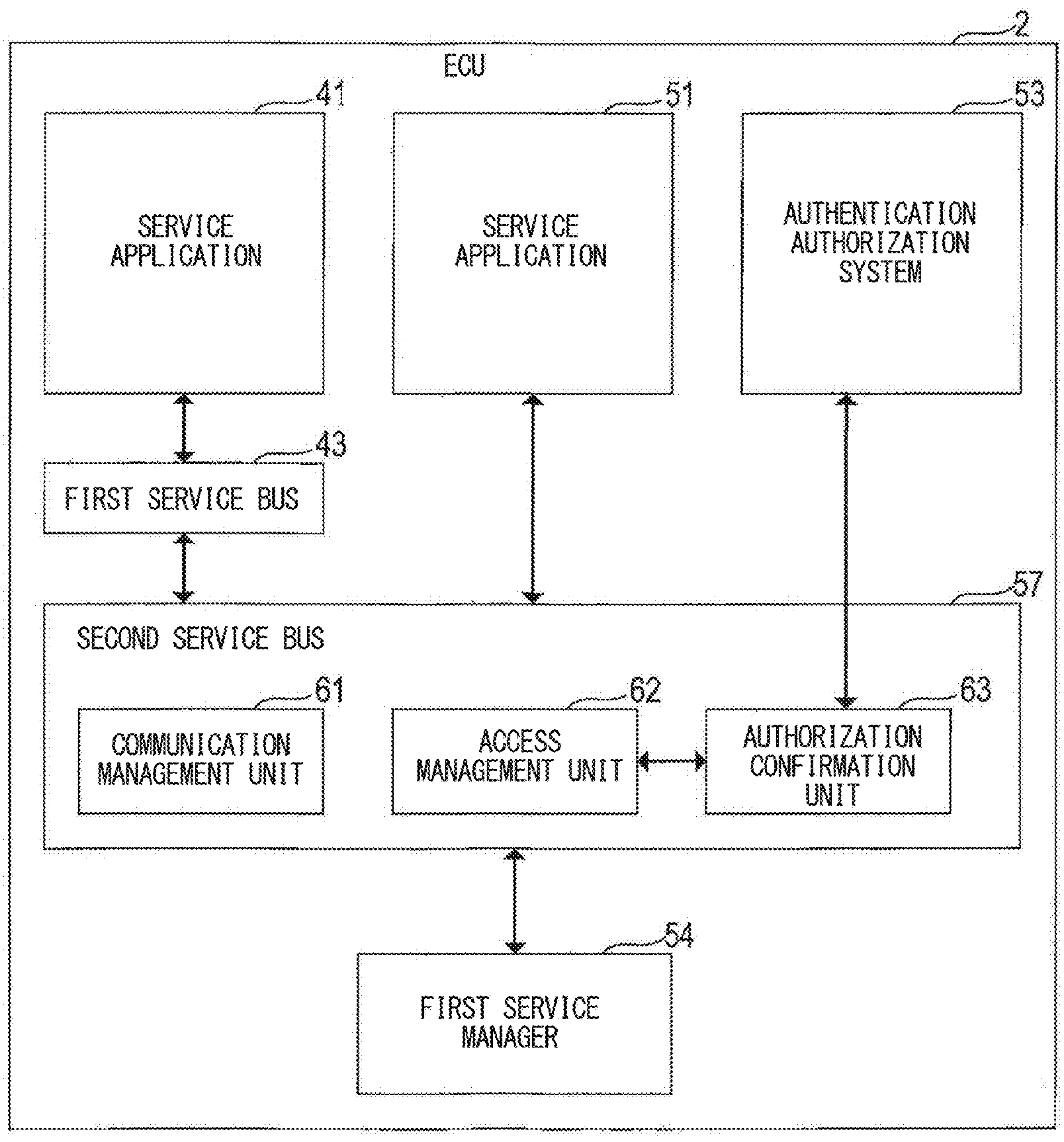
FIG. 3 is a block diagram showing a data communication path in the ECU in a first embodiment.

As shown in FIG. 3, the second service bus 57 includes a communication management unit 61, an access management unit 62, and an authorization confirmation unit 63.

The communication management unit 61 manages communications between the service applications 41 and 42 and between the service applications 51 and 52 and the first, second and third service managers 54, 55 and 56. In FIG. 3, in order to simplify the drawing, the service application 42, the service application 52, and the second and third service managers 55 and 56 are omitted from the illustration.

The access management unit 62 manages access from the service applications 41 and 42 and the service applications 51 and 52 to the first, second, and third service managers 54, 55, and 56.

The authorization confirmation unit 63 performs consent confirmation of the vehicle user regarding authorization of access from the service applications 41 and 42 and the service applications 51 and 52 to the first, second, and third service managers 54, 55, and 56.

The first service bus 43 and the second service bus 57 are able to communicate data with each other. Therefore, the service applications 41 and 42 installed in the first virtual machine 32 can access the first, second, and third service managers 54, 55 and 56 via the first service bus 43 and the second service bus 57.

Although not shown in the figure, the first service bus 43 has functions corresponding to the communication management unit 61, the access management unit 62, and the authorization confirmation unit 63.

Next, a procedure for the service application 41 to acquire the vehicle current position information from the first service manager 54 will be described with reference to FIG. 4.

Figure 4:
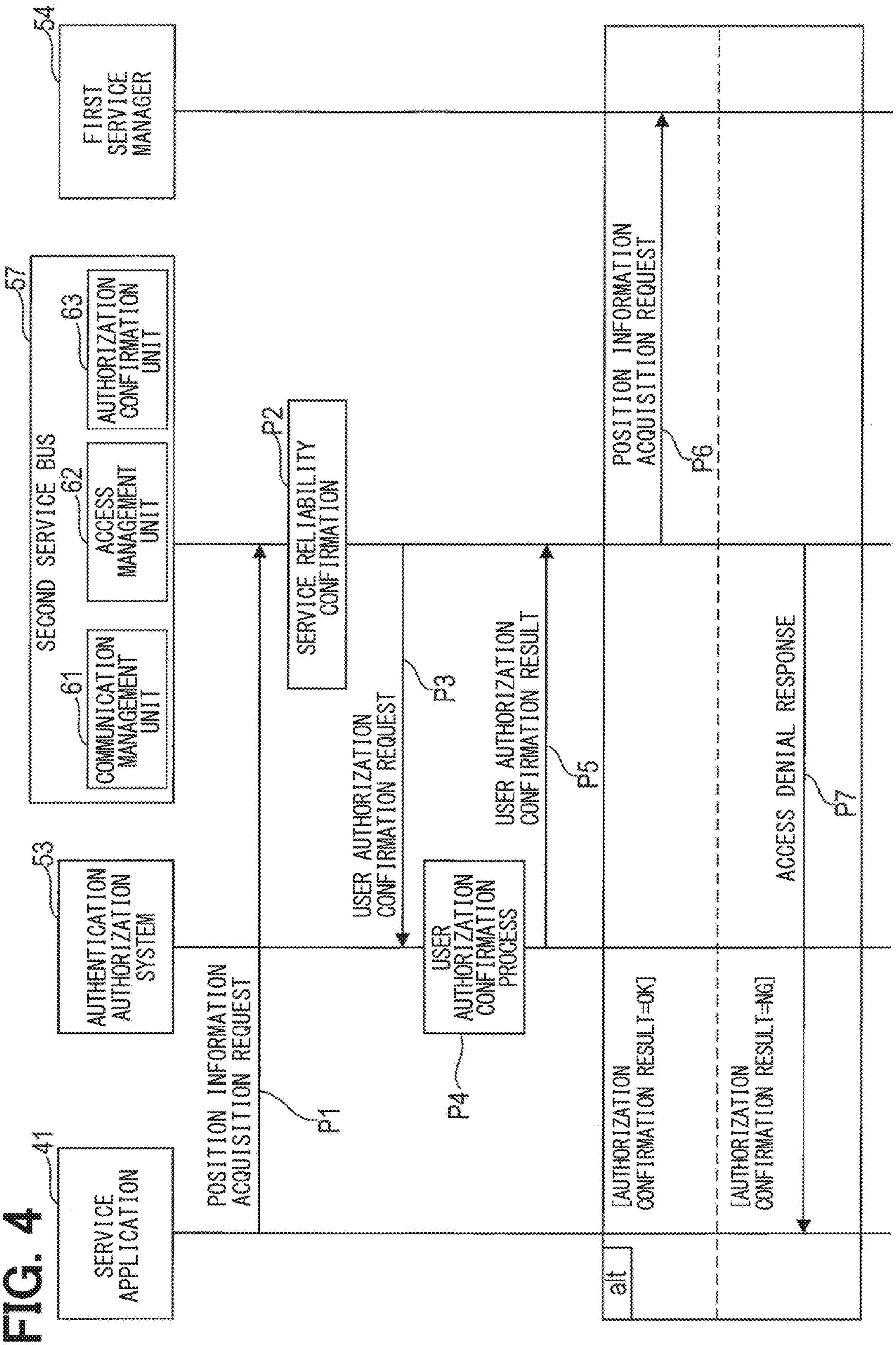
FIG. 4 is a sequence diagram showing a procedure for acquiring current position information in the first embodiment.

As shown in a process P1 of FIG. 4, when the service application 41 transmits a request to acquire position information to the second service bus 57, the access management unit 62 of the second service bus 57 determines whether the service application 41 is permitted to acquire vehicle information, as shown in a process P2. Specifically, the access management unit 62 confirms the reliability of the service application 41, and determines whether acquisition of vehicle information is permitted based on the reliability.

When the access management unit 62 determines that the service application 41 is permitted to acquire vehicle information, the authorization confirmation unit 63 transmits a user authorization confirmation request to the authentication authorization system 53 as shown in a process P3.

When the authentication authorization system 53 receives the user authorization confirmation request, it performs consent confirmation of the vehicle user regarding the authorization of access, as shown in a process P4.

Then, the authentication authorization system 53 transmits a user authorization confirmation result indicating the result of the consent confirmation of the vehicle user to the authorization confirmation unit 63 as shown in a process P5.

Upon receiving the user authorization confirmation result, the authorization confirmation unit 63 determines whether the user of the vehicle has consented to the authorization of access based on the received user authorization confirmation result.

When the vehicle user consents to the access authorization, the authorization confirmation unit 63 transmits a position information acquisition request to the first service manager 54, as shown in a process P6.

When the vehicle user does not consent to the access authorization, the authorization confirmation unit 63 transmits an access denial response to the service application 41 as shown in a process P7.

Next, a procedure when the service application 41 makes a service request to the first service manager 54 will be described with reference to FIG. 5. The procedure shown in FIG. 4 is a simplification of the procedure shown in FIG. 5.

Figure 5:
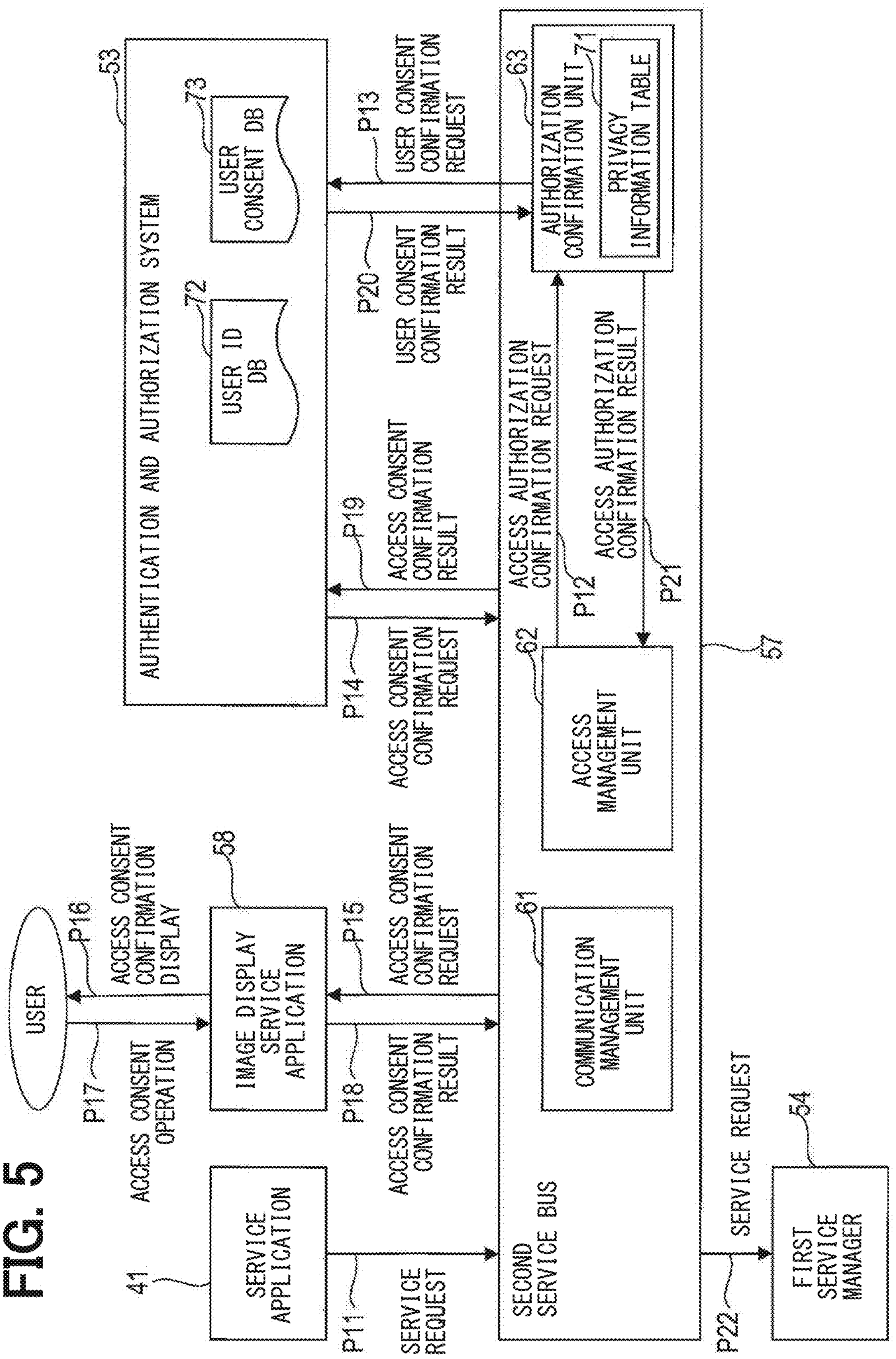
FIG. 5 is a sequence diagram showing a procedure for making a service request in the first embodiment.

As shown in a process P11 of FIG. 5, the service application 41 transmits a service request to the second service bus 57. The service request includes a service identifier for identifying the service provided by the service application 41 and a data identifier for identifying the data requested by the service application 41.

When the access management unit 62 receives a service request, it determines whether the service application 41 is permitted to acquire vehicle information based on the service identifier included in the service request.

When it is determined that acquisition of the vehicle information is permitted, the access management unit 62 transmits an access authorization confirmation request to the authorization confirmation unit 63 as shown in a process P12. The access authorization confirmation request includes a service identifier and a data identifier.

The authorization confirmation unit 63 has a privacy information table 71 stored in the ROM 22. The privacy information table 71 sets whether each of a plurality of data types specified by a data identifier corresponds to privacy information.

When the authorization confirmation unit 63 receives the access authorization confirmation request, it determines whether the data requested by the service application 41 corresponds to privacy information, based on the data identifier included in the access authorization confirmation request.

When the information does not correspond to the privacy information, the authorization confirmation unit 63 transmits, to the access management unit 62, an access permission indicating that the access is authorized.

When the information corresponds to privacy information, the authorization confirmation unit 63 transmits a user consent confirmation request to the authentication authorization system 53 to confirm whether the user has given consent, as shown in a process P13. The user consent confirmation request includes the above-described service identifier and a privacy information identifier for identifying the privacy information requested by the service application 41.

The authentication authorization system 53 includes a user identification database 72 and a user consent database 73 in the ROM 22.

The user identification database 72 stores user identification information for identifying the current vehicle user. Identification of the current user is performed by an authentication device installed in the vehicle, and the authentication results by the authentication device are stored in the user identification database 72. The authentication device identifies the current user by an authentication method such as password authentication and face authentication. The password authentication is performed by the user inputting a password into an authentication device. The face authentication is a method of authentication that involves analyzing an image of a user face. The user identification database 72 stores, for example, a user ID, an authentication method, and an authentication result.

The user consent database 73 stores information indicating whether each of a plurality of users identified by the user identification information has consented to access to privacy information. The user consent database 73 is stored in the ROM 22. The presence or absence of consent may be stored separately for each type of privacy information. The user consent database 73 stores, for example, a user ID, a target privacy information identifier, and consent or non-consent.

When the authentication authorization system 53 receives a user consent confirmation request, it refers to the user identification database 72 and the user consent database 73 to determine whether the current user has consented to accessing the privacy information of the specified identifier.

When it is determined that the current user has consented to the access to the privacy information, the authentication authorization system 53 transmits an access consent result (access consented) indicating that the access has been consented to the authorization confirmation unit 63.

When it is determined that the current user has not consented to access to the privacy information, the authentication authorization system 53 transmits an access consent confirmation request to the second service bus 57 to acquire the user access consent, as shown in a process P14.

When the second service bus 57 receives the access consent confirmation request, it transmits the access consent confirmation request to a screen display service application 58 installed in the ECU 2 as shown in a process P15.

When the screen display service application 58 receives the access consent confirmation request, as shown in a process P16, it displays an image on the display screen of the display device in the vehicle interior to confirm whether the user consents to access of the privacy information by the service application 41.

Then, as shown in a process P17, an access consent operation for indicating whether the access is consented is performed by the user of the vehicle. Then, the screen display service application 58 transmits, to the second service bus 57, an access consent confirmation result indicating whether the user has consented to the access as shown in a process P18.

Upon receiving the access consent confirmation result, the second service bus 57 transmits the access consent confirmation result to the authentication authorization system 53 as shown in a process P19.

When the authentication authorization system 53 receives the access consent confirmation result, it stores the access consent confirmation result in the user consent database 73, and further, as shown in a process P20, transmits, to the authorization confirmation unit 63, a user consent confirmation result indicating whether the current user has agreed to the access based on the access consent confirmation result.

When the authorization confirmation unit 63 receives the user consent confirmation result, as shown in a process P21, it transmits, to the access management unit 62, an access permission confirmation result indicating whether the access to the privacy information has been authorized based on the user consent confirmation result.

When the access to the privacy information is authorized, the access management unit 62 transmits a service request to the first service manager 54, as shown in a process P22.

When the access to the privacy information is not permitted, the access management unit 62 transmits an access denial response to the service application 41.

Figure 6:
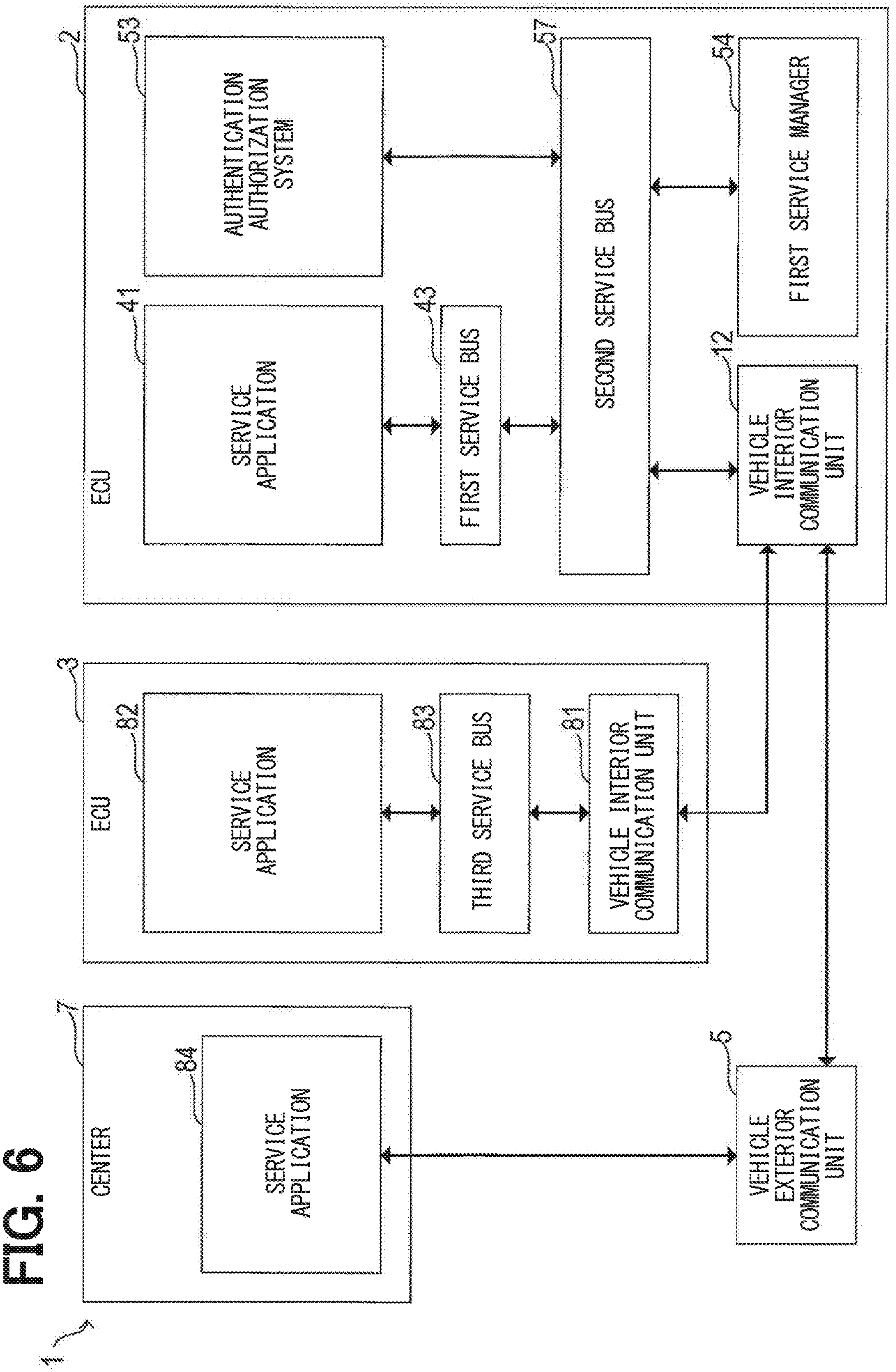
FIG. 6 is a block diagram showing paths of data communication in the vehicle control system.

As shown in FIG. 6, one of the plurality of ECUs 3 includes an in-vehicle communication unit 81, a service application 82, and a third service bus 83.

The in-vehicle communication unit 81 is connected to the ECU 2 and performs data communication between the ECU 2 and other ECUs (i.e., the ECUs 3 and 4 and the vehicle exterior communication device 5).

The service application 82 is an application produced by the third party to provide services to vehicle users. The service application 82 provides a service different from the service applications 41 and 42 to the vehicle user.

The third service bus 83 is an application that provides messaging processing that manages the exchange of messages between the service application 82 and the outside of the ECU 3.

When the ECU 2 receives a service request from the service application 82, the ECU 2 transmits the privacy information to the service application 82 in the same manner as when the ECU 2 receives a service request from the service applications 41 and 42.

The ECU 2 performs data communication with the center 7 via the vehicle exterior communication device 5.

The center 7 includes a service application 84. The service application 84 is an application produced by the third party to provide services to vehicle users. The service application 84 provides a service different from the service applications 41, 42, and 82 to the vehicle user.

When the ECU 2 receives a service request from the service application 84, the ECU 2 transmits the privacy information to the service application 84 in the same manner as when the ECU 2 receives a service request from the service applications 41 and 42.

The vehicle control system 1 of the first embodiment configured in such a manner includes the service applications 41 and 42, the service applications 51 and 52, the first, second and third service managers 54, 55 and 56, the first and second service buses 43 and 57, and the authorization confirmation unit 63. Hereinafter, the service applications 41 and 42 and the service applications 51 and 52 will be collectively referred to as service applications 41, 42, 51, and 52.

The service applications 41, 42, 51, and 52 utilize vehicle information related to the vehicle to provide services to the vehicle.

The first, second, and third service managers 54, 55 and 56 acquire vehicle information stored in other ECUs of the vehicle (i.e., the ECUs 3 and 4 and the vehicle exterior communication device 5), and transmit commands to the other ECUs of the vehicle. Hereinafter, the first, second, and third service managers 54, 55, and 56 will be collectively referred to as service managers 54, 55, and 56.

The first and second service buses 43 and 57 manages the transmission and reception of data between the service applications 41, 42, 51, and 52 and the service managers 54, 55, and 56.

The authorization confirmation unit 63 confirms whether to approve the service request for privacy information (provision of privacy information) based on whether the user has consented when the service application 41, 42, 51, 52 makes the service request to the service manager 54, 55, 56 to request the provision of privacy information among the vehicle information.

The authorization confirmation unit 63 is mounted on the second service bus 57.

In such a vehicle control system 1, the authorization confirmation unit 63 is mounted on the second service bus 57. Therefore, the vehicle control system 1 can determine whether to provide vehicle information in response to a service request from the service applications 41, 42, 51, and 52. As a result, the vehicle control system 1 can prevent the occurrence of a situation in which vehicle information that should not be provided to the service applications 41, 42, 51, and 52 is provided to the service applications 41, 42, 51, and 52. It is possible to improve a security level in providing information.

The vehicle control system 1 also includes the authentication authorization system 53 that verifies whether the user has given consent to a service request. The authorization confirmation unit 63 is configured such that, when the service application 41, 42, 51, or 52 makes a service request, the authorization confirmation unit 63 confirms with the authentication authorization system 53 whether the user has consented to the service request, and authorizes the service request when the user has consented. Such a vehicle control system 1 can determine whether to approve the service request based on the consent of the vehicle user.

The vehicle control system 1 also includes the ECU 2. The ECU 2 includes service managers 54, 55, 56 and first and second service buses 43, 57. The service application 82 is installed in an ECU 3 that is installed in a vehicle and capable of data communication with the ECU 2. The service application 84 is installed in a center 7 that is installed outside the vehicle and capable of data communication with the ECU 2. Thereby, the ECU 2 can determine whether to approve the service request from the ECU 3 mounted on the vehicle and the service request from the center 7 installed outside the vehicle.

The vehicle control system 1 also includes the privacy information table 71 and the user consent database 73. The privacy information table 71 stores privacy setting information indicating whether each of a plurality of vehicle information corresponds to privacy information. The user consent database 73 stores the access consent information indicating whether the user has consented to access to the privacy information. The authorization confirmation unit 63 then uses the privacy setting information stored in the privacy information table 71 and the access consent information stored in the user consent database 73 to confirm whether to authorize the service request.

Thereby, the authorization confirmation unit 63 can eliminate the need to confirm with the authentication authorization system 53 about vehicle information that does not correspond to privacy information. Therefore, the vehicle control system 1 can reduce the processing load of the authorization confirmation unit 63.

The ECU 2 is a relay device that relays data transmitted from the ECUs 3 and 4 to the vehicle CAN or Ethernet.

The ECU 2 includes the service applications 41 and 42, the service applications 51 and 52, the service managers 54, 55, and 56, the first and second service buses 43 and 57, and the authorization confirmation unit 63.

The service managers 54, 55, 56 acquire vehicle information stored in the ROM 22 and RAM 23 of the ECU 2, or the ROMs 25, 28 and RAMs 26, 29 of the ECUs 3 and 4.

The authorization confirmation unit 63 confirms whether to authorize the service request for privacy information based on whether the user has consented when the service application 41, 42, 51, 52 makes the service request for the provision of privacy information among the vehicle information stored in the ROM 25, 28 and RAM 26, 29 of the ECUs 3, 4, or the ROM 22 and RAM 23 of the ECU 2. The authorization confirmation unit 63 is mounted on the second service bus 57.

Like the vehicle control system 1, such an ECU 2 can improve the security level in providing information.

In the embodiment described above, the vehicle control system 1 corresponds to an authentication system, the first and second service buses 43, 57 correspond to service buses, a service request corresponds to a vehicle information acquisition request and an acquisition request, the authentication authorization system 53 corresponds to a user consent confirmation unit, and the ECUs 3, 4 and the vehicle exterior communication device 5 correspond to electronic control units of the vehicle.

In addition, the ECU 2 corresponds to a first electronic control unit, the ECU 3 corresponds to a second electronic control unit, the privacy information corresponds to confidential information, the privacy setting information corresponds to confidential setting information, the privacy information table 71 corresponds to a confidential setting memory storage, and the user consent database 73 corresponds to a user consent memory storage.

Further, the ECU 2 corresponds to a relay device, the CAN and the Ethernet correspond to a communication network, the ROM 22 and the RAM 23 correspond to a first storage, and the ROMs 25, 28 and the RAMs 26, 29 correspond to a second storage.

Second Embodiment

Hereinafter, a second embodiment of the present disclosure will be described with reference to the drawings. In the second embodiment, portions different from those of the first embodiment will be described. Common configurations are denoted by the same reference numerals.

The vehicle control system 1 of the second embodiment differs from the first embodiment in that the configuration of the ECU 2 is changed.

Figure 7:
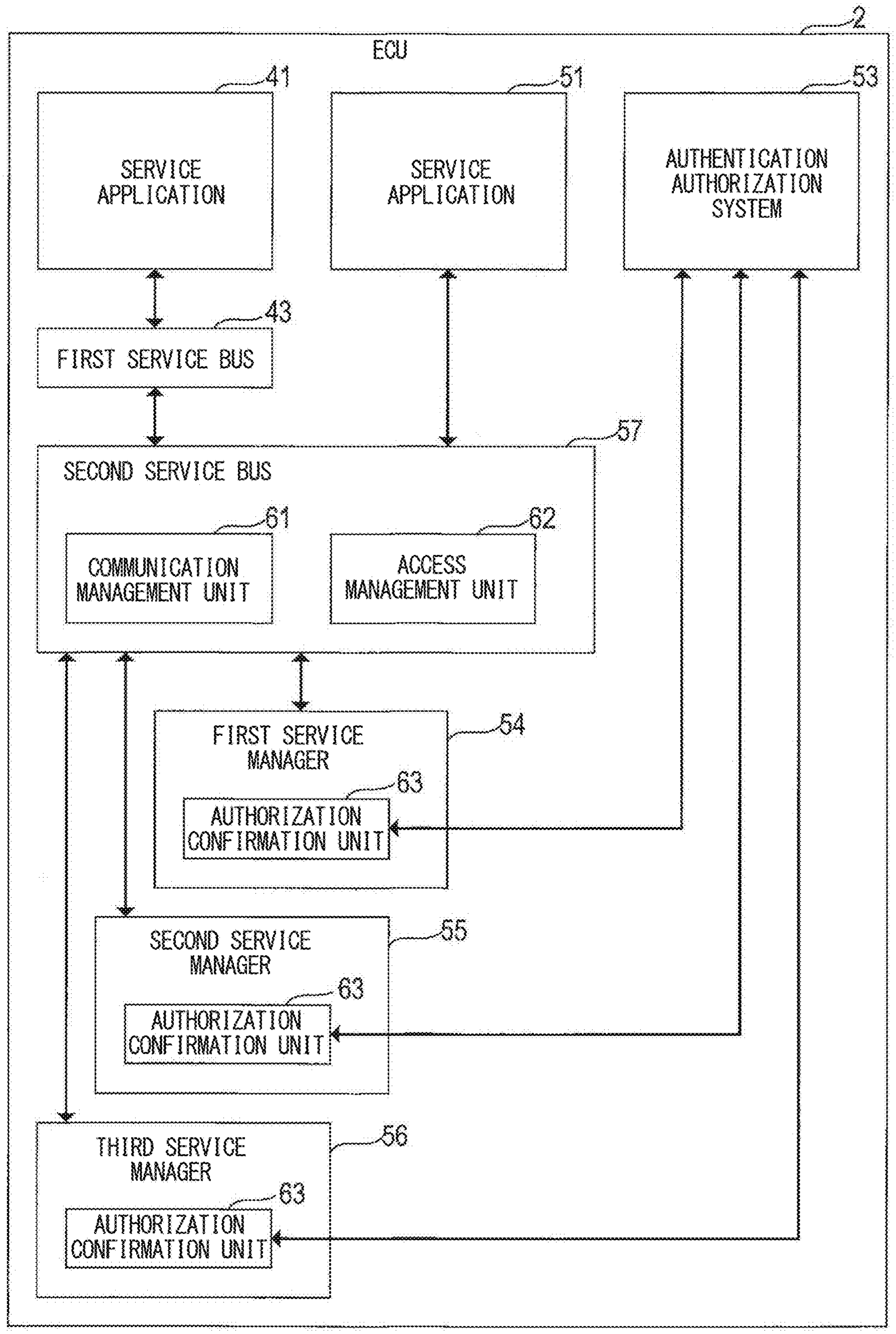
FIG. 7 is a block diagram showing a data communication path in the ECU in a second embodiment.

Specifically, as shown in FIG. 7, the second embodiment differs from the first embodiment in that the first, second, and third service managers 54, 55, and 56 each include the authorization confirmation unit 63 instead of the second service bus 57.

Next, a procedure for the service application 41 to acquire the vehicle current position information from the first service manager 54 will be described.

Figure 8:
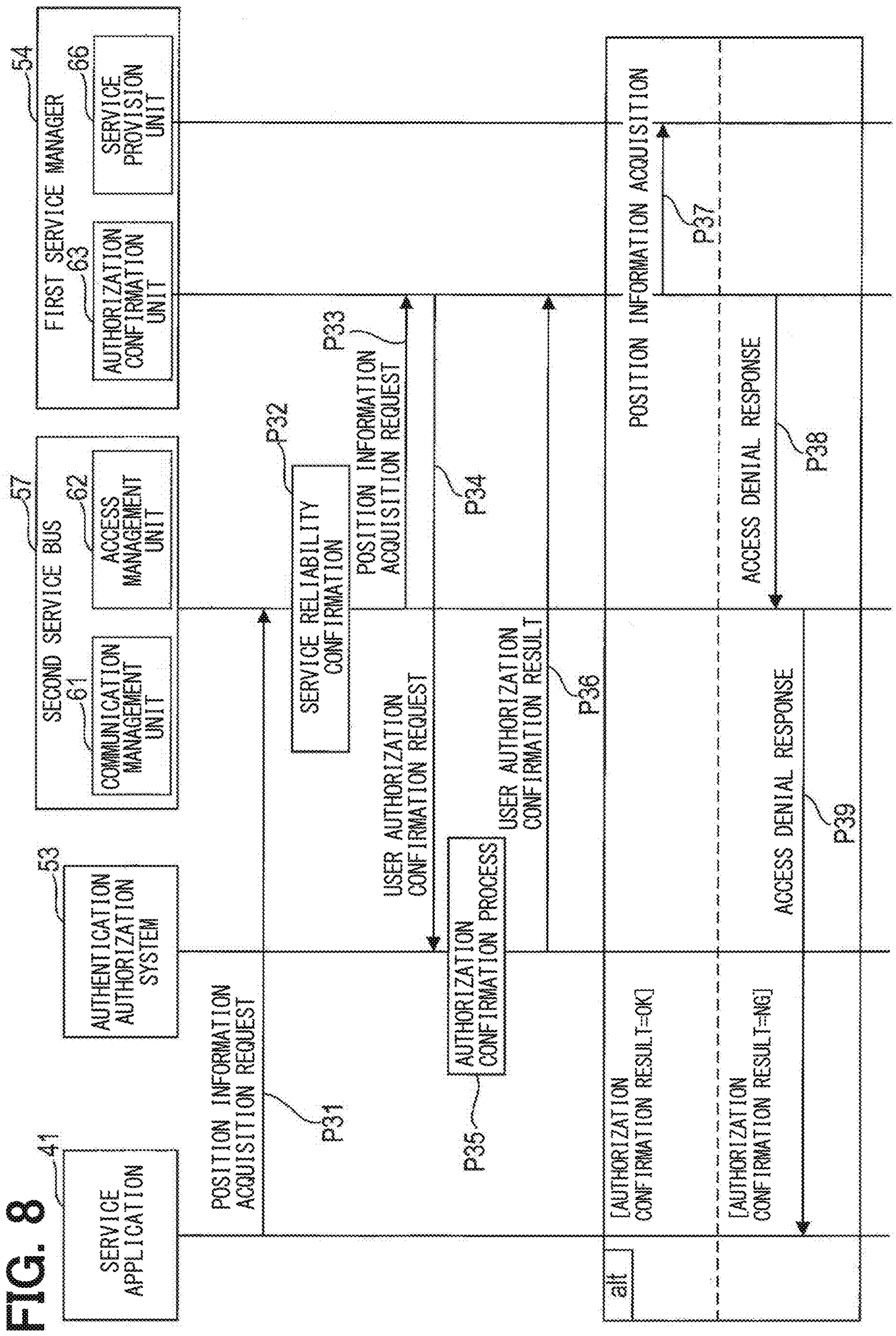
FIG. 8 is a sequence diagram showing a procedure for acquiring current position information in the second embodiment.

As shown in a process P31 of FIG. 8, when the service application 41 transmits a request to acquire position information to the second service bus 57, the access management unit 62 of the second service bus 57 determines whether the service application 41 is permitted to acquire vehicle information, as shown in a process P32.

When the access management unit 62 determines that the service application 41 is permitted to acquire the vehicle information, the access management unit 62 transmits a location information acquisition request to the first service manager 54 as shown in a process P33.

When the authorization confirmation unit 63 of the first service manager 54 receives the position information acquisition request, it transmits a user authorization confirmation request to the authentication authorization system 53 as shown in a process P34.

When the authentication authorization system 53 receives the user authorization confirmation request, it performs consent confirmation of the vehicle user regarding the authorization of access, as shown in a process P35.

Then, as shown in a process P36, the authentication authorization system 53 transmits a user authorization confirmation result indicating the result of the consent confirmation of the vehicle user to the authorization confirmation unit 63 of the first service manager 54.

Upon receiving the user authorization confirmation result, the authorization confirmation unit 63 determines whether the user of the vehicle has consented to the authorization of access based on the received user authorization confirmation result.

When the vehicle user consents to the access authorization, the authorization confirmation unit 63 transmits a position information acquisition request to the service provision unit 66 of the first service manager 54, as shown in a process P37.

When the vehicle user does not consent to the access authorization, the authorization confirmation unit 63 transmits the access denial response to the second service bus 57 as shown in a process P38. Upon receiving the access denial response, the second service bus 57 transmits the access denial response to the service application 41 as shown in a process P39.

The vehicle control system 1 of the second embodiment configured in such a manner includes the service applications 41,42, 51, and 52, the service managers 54, 55 and 56, the first and second service buses 43 and 57, and the authorization confirmation unit 63. The authorization confirmation unit 63 is installed in the service managers 54, 55, and 56.

In such a vehicle control system 1, the authorization confirmation unit 63 is mounted on the service managers 54, 55, and 56. Therefore, the vehicle control system 1 can determine whether to provide vehicle information in response to a service request from the service applications 41, 42, 51, and 52. As a result, the vehicle control system 1 can prevent the occurrence of a situation in which vehicle information that should not be provided to the service applications 41, 42, 51, and 52 is provided to the service applications 41, 42, 51, and 52. It is possible to improve a security level in providing information.

Third Embodiment

Hereinafter, a third embodiment of the present disclosure will be described with reference to the drawings. In the third embodiment, portions different from those of the first embodiment will be described. Common configurations are denoted by the same reference numerals.

The vehicle control system 1 of the third embodiment differs from the first embodiment in that the configuration of the ECU 2 is changed.

Figure 9:
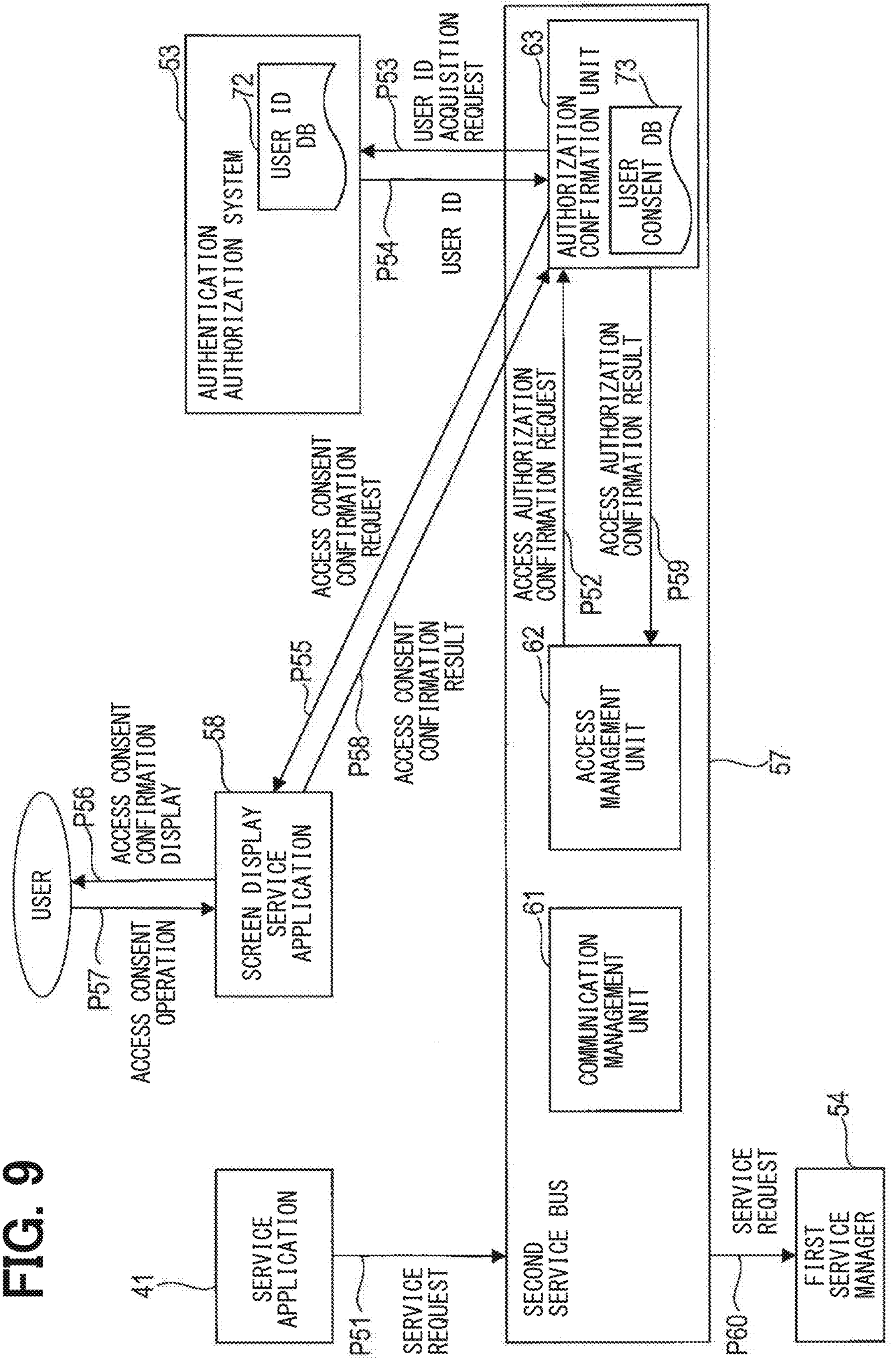
FIG. 9 is a sequence diagram showing a procedure for making a service request in a third embodiment.

Specifically, as shown in FIG. 9, the second embodiment differs from the first embodiment in that the authorization confirmation unit 63 includes the user consent database 73 instead of the authentication authorization system 53.

Next, a procedure when the service application 41 makes a service request to the first service manager 54 will be described with reference to FIG. 9.

As shown in a process P51 of FIG. 9, the service application 41 transmits a service request to the second service bus 57.

When the access management unit 62 receives a service request, it determines whether the service application 41 is permitted to acquire vehicle information based on the service identifier included in the service request.

When it is determined that acquisition of the vehicle information is permitted, the access management unit 62 transmits an access authorization confirmation request to the authorization confirmation unit 63 as shown in a process P52.

When the authorization confirmation unit 63 receives the access authorization confirmation request, it determines whether the data requested by the service application 41 corresponds to privacy information, based on the data identifier included in the access authorization confirmation request.

When the information does not correspond to the privacy information, the authorization confirmation unit 63 transmits, to the access management unit 62, an access permission indicating that the access is authorized.

When the information corresponds to privacy information, the authorization confirmation unit 63 transmits a user ID acquisition request requesting user identification information for identifying the current user to the authentication authorization system 53 as shown in a process P53.

When the authentication authorization system 53 receives the user ID acquisition request, it extracts the user identification information from the user identification database 72, and transmits the extracted user identification information to the authorization confirmation unit 63 as shown in a process P54.

When the authorization confirmation unit 63 receives the user identification information, it refers to the user consent database 73 to determine whether the current user has consented to access to the privacy information.

When it is determined that the current user has consented to the access to the privacy information, the authorization confirmation unit 63 transmits the access consent result indicating that the access has been consented to, to the access management unit 62.

When it is determined that the current user has not consented to the access to the privacy information, the authorization confirmation unit 63 transmits an access consent confirmation request to the screen display service application 58 as shown in a process P55.

When the screen display service application 58 receives the access consent confirmation request, as shown in a process P56, it displays an image on the display screen of the display device in the vehicle interior to confirm whether the user agrees to access of the privacy information by the service application 41.

Then, as shown in a process P57, an access consent operation for indicating whether the access is consented to is performed by the user of the vehicle. Then, the screen display service application 58 transmits, to the second service bus 57, an access consent confirmation result indicating whether the user has consented to the access as shown in a process P58.

When the authorization confirmation unit 63 of the second service bus 57 receives the access consent confirmation result, the authorization confirmation unit 63 stores the access consent confirmation result in the user consent database 73. Furthermore, as shown in a process P59, the access permission confirmation result indicating whether access to the privacy information is permitted is transmitted to the access management unit 62 based on the access consent confirmation result.

When the access to the privacy information is authorized, the access management unit 62 transmits a service request to the first service manager 54, as shown in a process P60.

When the access to the private information is not permitted, the access management unit 62 transmits an access denial response to the service application 41.

The vehicle control system 1 of the third embodiment thus configured can improve the security level in providing information, similarly to the first embodiment.

Fourth Embodiment

Hereinafter, a fourth embodiment according to the present disclosure will be described with reference to the drawings. In the fourth embodiment, portions different from those of the first embodiment will be described. Common configurations are denoted by the same reference numerals.

The vehicle control system 1 of the fourth embodiment differs from the first embodiment in that the configuration of the ECU 2 is changed.

Figure 10:
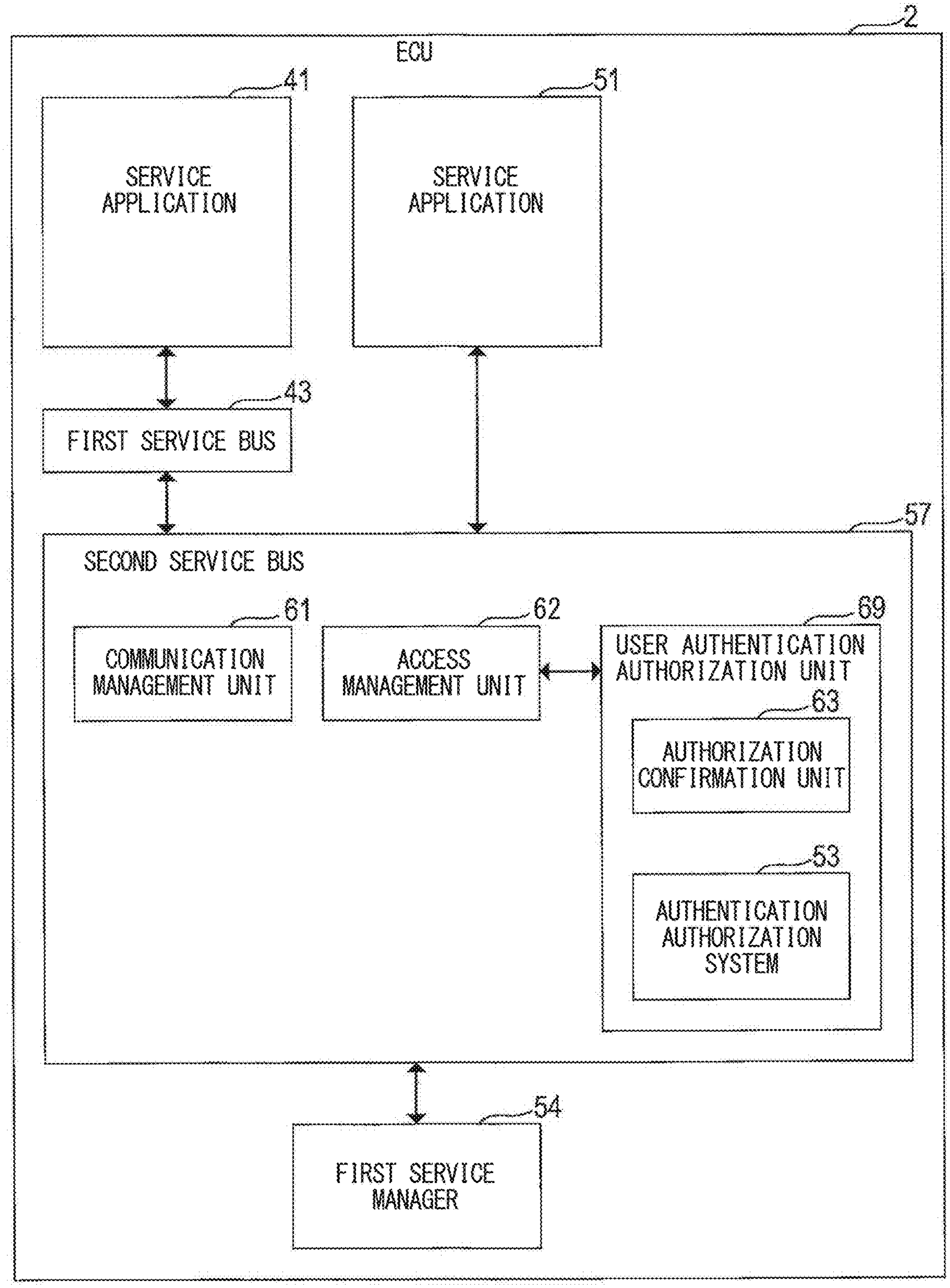
FIG. 10 is a block diagram showing a data communication path in the ECU in a fourth embodiment.

Specifically, as shown in FIG. 10, the second embodiment differs from the first embodiment in that a user authentication authorization unit 69 is provided instead of the authorization confirmation unit 63 and the authentication authorization system 53.

The user authentication authorization unit 69 is mounted on the second service bus 57. The second service bus 57 has the functions of the authorization confirmation unit 63 and the authentication authorization system 53.

In the vehicle control system 1 of the fourth embodiment configured as described above, the authorization confirmation unit 63 and the authentication authorization system 53 are mounted on the second service bus 57. As a result, similarly to the first embodiment, the vehicle control system 1 of the fourth embodiment can prevent the occurrence of a situation in which vehicle information that should not be provided to the service applications 41, 42, 51, and 52 is provided to the service applications 41, 42, 51, and 52. It is possible to improve a security level in providing information.

Fifth Embodiment

Hereinafter, a fifth embodiment according to the present disclosure will be described with reference to the drawings. In the fifth embodiment, portions different from those of the first embodiment will be described. Common configurations are denoted by the same reference numerals.

The vehicle control system 1 of the fifth embodiment differs from the first embodiment in that the configuration of the ECU 2 is changed.

Figure 11:
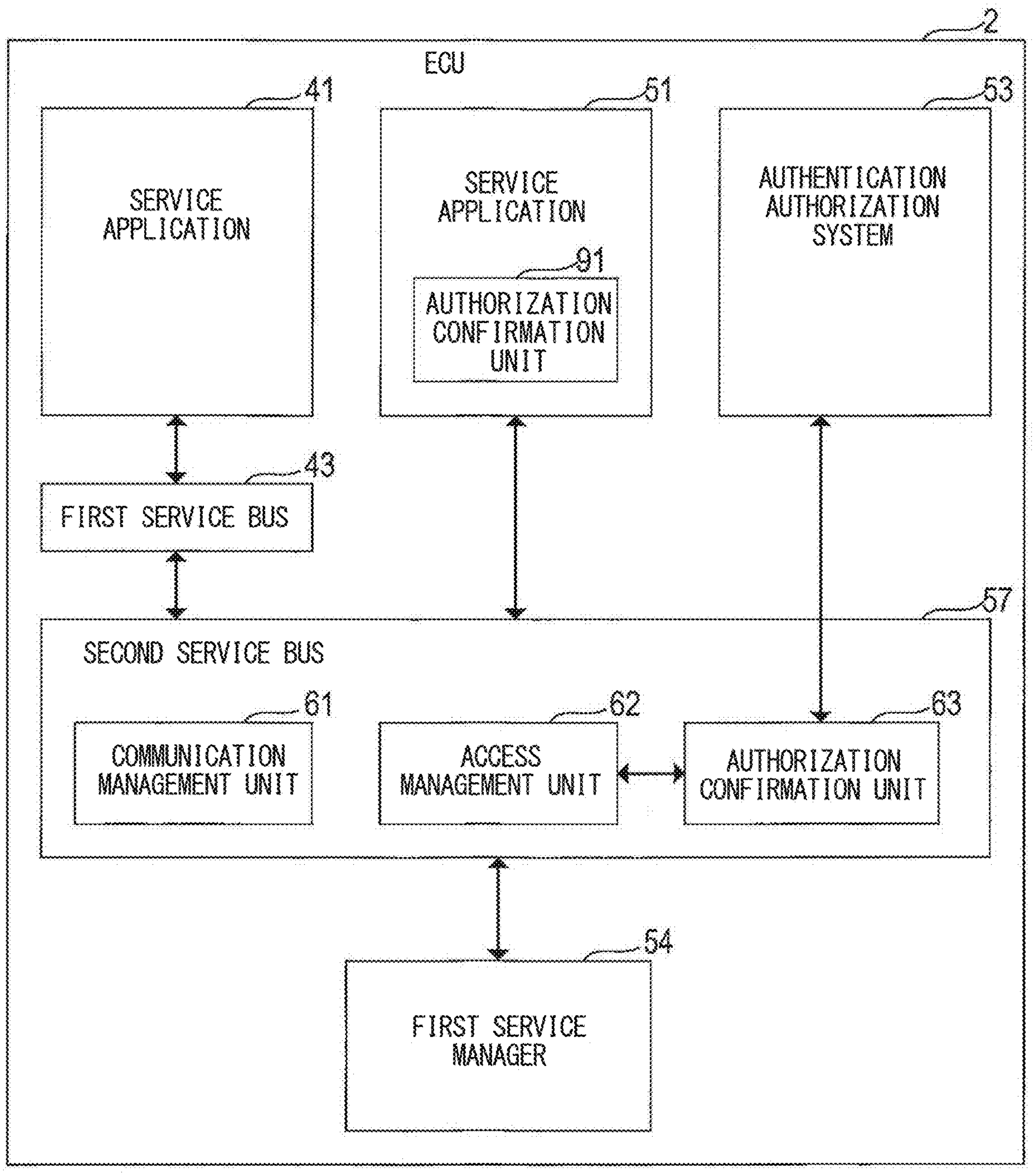
FIG. 11 is a block diagram showing a data communication path in the ECU in a fifth embodiment.

Specifically, as shown in FIG. 11, the second embodiment differs from the first embodiment in that the service applications 51 and 52 each include an authorization confirmation unit 91. In FIG. 11, the service application 52 is omitted for the sake of simplicity. Here, both the service applications 41 and 51 may be third party applications, or the service application 41 may be a third party application, and the service application 51 may be an OEM application.

The authorization confirmation unit 91 has the same function as the authorization confirmation unit 63.

That is, the authorization confirmation unit 91 of the service application 51 first transmits a user consent confirmation request to the authentication authorization system 53 before the service application 51 transmits a service request to the second service bus 57.

Then, when the authorization confirmation unit 91 receives the user agreement confirmation result from the authentication authorization system 53, it determines whether the access to the privacy information is authorized based on the user consent confirmation result.

When the access to the privacy information is authorized, the service application 51 sends a service request to the second service bus 57. The second service bus 57 does not perform authorization confirmation with the authorization confirmation unit 63.

On the other hand, when the access to the privacy information is not authorized, the service application 51 stops transmitting the service request.

Therefore, in the vehicle control system 1 of the fifth embodiment, when a service request is transmitted from the service application 41 or 42, the authorization confirmation unit 63 executes a process for authorization confirmation. When the service request is transmitted from the service application 51, 52, no processing for authorization confirmation is executed.

In the vehicle control system 1 of the fifth embodiment configured as described above, the service applications 51 and 52 include the authorization confirmation unit 91. The authorization confirmation unit 91 confirms whether the service requests of the service applications 51 and 52 are authorized, when the service applications 51 and 52 make service requests to the service managers 54, 55 and 56. The authorization confirmation unit 63 confirms with the authentication authorization system 53 whether the user has consented to the service request from the service applications 41 and 42.

Such a vehicle control system 1 can prevent the occurrence of a situation in which vehicle information that should not be provided to the service applications 41, 42, 51, and 52 is provided to the service applications 41, 42, 51, and 52. It is possible to improve a security level in providing information.

In the above-described embodiments, the service applications 41 and 42 correspond to third party service applications, the service applications 51 and 52 correspond to OEM service applications, and the authorization confirmation unit 91 corresponds to an OEM authorization confirmation unit.

As described above, the embodiments of the present disclosure are described, but the present disclosure is not limited to the above embodiments, and can be implemented with various modifications.

First Modification

For example, in the above embodiments, a form was shown in which it was determined whether the user of the vehicle has consented to the request to acquire the privacy information, but it would also be acceptable for the OEM of the vehicle to determine whether the OEM has consented to the request to acquire the privacy information.

Second Modification

In the above embodiments, the ECU 2 includes the vehicle interior communication unit 12. However, the ECU 2 does not necessarily need to include the vehicle interior communication unit 12. The vehicle interior communication unit 12 may be included in another ECU, or may be mounted on another independent ECU.

Third Modification

In the above embodiments, the ECU 2 is shown to have two virtual machines, but the ECU 2 may have functions equivalent to the first and second virtual machines 32 and 33 without having any virtual machines, or may have three or more virtual machines.

Fourth Modification

In the above embodiments, the low-reliability service applications 41 and 42 that are manufactured under a process in which privacy protection cannot be guaranteed are installed in the first virtual machine 32. However, the low-reliability service application does not need to be installed in the first virtual machine 32. For example, the low-reliability service application may be installed in any virtual machine, or may be installed directly on a hypervisor when no virtual machine is available.

Fifth Modification

In the above embodiments, the high-reliable service applications 51 and 52 manufactured under a process that can guarantee privacy protection are installed in the second virtual machine 33. However, the high-reliability service application does not need to be installed in the second virtual machine 33. For example, the high-reliability service application may be installed in any virtual machine, or may be installed directly on a hypervisor when no virtual machine is available.

Sixth Modification

In the above embodiments, the first, second, and third service managers 54, 55, and 56 are installed in the second virtual machine 33. However, the service manager does not need to be installed in the second virtual machine 33. For example, the service manager may be installed in any virtual machine, or may be installed directly on a hypervisor when no virtual machine is available.

Seventh Modification

In the above embodiments, the authentication authorization system 53 is installed in the second virtual machine 33. However, the authentication authorization system does not need to be installed in the second virtual machine 33. For example, the authentication authorization system may be installed in any virtual machine, or may be installed directly on a hypervisor when no virtual machine is available.

The controller 11 and the techniques thereof according to the present disclosure may be implemented by one or more dedicated computers. Such a dedicated computer may be provided by configuring a processor and a memory programmed to execute one or more functions embodied by a computer program. Alternatively, the controller 11 and the method thereof described in the present disclosure may be implemented by a dedicated computer provided by configuring a processor with one or more dedicated hardware logic circuits. Alternatively, the controller 11 and the method thereof described in the present disclosure may be implemented by one or more dedicated computers configured by a combination of a processor and a memory programmed to perform one or a plurality of functions and a processor configured with one or more hardware logic circuits. Further, the computer program may be stored in a computer-readable non-transitory tangible storage medium as instructions to be executed by a computer. The technique for implementing the functions of each unit included in the controller 11 does not necessarily need to include software, and all the functions may be implemented using one or a plurality of hardware circuits.

A plurality of functions belonging to one configuration element in the above-described embodiment may be implemented by a plurality of configuration elements, or one function belonging to one configuration element may be implemented by a plurality of configuration elements. A plurality of functions belonging to a plurality of configuration elements may be implemented by one configuration element, or one function implemented by a plurality of configuration elements may be implemented by one configuration element. Further, a part of the configuration of the above embodiment may be omitted. At least a part of the configuration of the embodiment may be added to or replaced with another configuration of the embodiment.

The present disclosure may be implemented, in addition to the ECU 2 described above, various forms such as a system including the ECU 2 as a component, a program for causing a computer to function as the ECU 2, a non-transitory tangible storage medium including a semiconductor memory storing the program, an authentication method.

What is claimed is:

1. An authentication system comprising:

a processor; and a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in an electronic control unit of the vehicle;

at least one service bus configured to manage transmission and reception of data between the at least one service application and the service manager;

an authorization confirmation unit configured to, when the at least one service application makes a vehicle information acquisition request that requests provision of confidential information among the vehicle information, confirm whether to authorize the vehicle information acquisition request of the confidential information based on whether a user has consented; and a user consent confirmation unit configured to confirm whether the user has consented to the vehicle information acquisition request, wherein:

the authorization confirmation unit is installed in the at least one service bus;

the authorization confirmation unit confirms with the user consent confirmation unit whether the user has consented to the vehicle information acquisition request when the at least one service application makes the vehicle information acquisition request;

the authorization confirmation unit authorizes the vehicle information acquisition request when the user has consented;

the at least one service application includes a first service application manufactured by a third party and a second service application manufactured by a vehicle manufacturer;

the second service application includes a second authorization confirmation unit configured to confirm whether to authorize the vehicle information acquisition request of the second service application when the second service application makes the vehicle information acquisition request; and the authorization confirmation unit is configured to confirm with the user consent confirmation unit whether the user has consented to the vehicle information acquisition request from the first service application.

2. The authentication system according to claim 1, wherein the authorization confirmation unit and the user consent confirmation unit are installed in the at least one service bus.

3. An authentication system comprising:

a processor; and a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in an electronic control unit of the vehicle;

at least one service bus configured to manage transmission and reception of data between the at least one service application and the service manager;

an authorization confirmation unit configured to, when the at least one service application makes a vehicle information acquisition request that requests provision of confidential information among the vehicle information, confirm whether to authorize the vehicle information acquisition request of the confidential information based on whether a user has consented; and a user consent confirmation unit configured to confirm with the user whether the user has consented to the vehicle information acquisition request, wherein:

the authorization confirmation unit is installed in the service manager;

the authorization confirmation unit confirms with the user consent confirmation unit whether the user has consented to the vehicle information acquisition request when the at least one service application makes the vehicle information acquisition request;

the authorization confirmation unit authorizes the vehicle information acquisition request when the user has consented;

the at least one service application includes a first service application manufactured by a third party and a second service application manufactured by a vehicle manufacturer;

the second service application includes a second authorization confirmation unit configured to confirm whether to authorize the vehicle information acquisition request of the second service application when the second service application makes the vehicle information acquisition request; and the authorization confirmation unit is configured to confirm with the user consent confirmation unit whether the user has consented to the vehicle information acquisition request from the first service application.

4. The authentication system according to claim 3, wherein:

the second service application confirms with the second authorization confirmation unit whether the vehicle information acquisition request is authorized before making the vehicle information acquisition request to the at least one service bus;

the second service application makes the vehicle information acquisition request to the at least one service bus when having confirmed with the second authorization confirmation unit that the vehicle information acquisition request is authorized; and the at least one service bus makes the vehicle information acquisition request to the service manager without confirming with the authorization confirmation unit whether to authorize the vehicle information acquisition request, when the second service application makes the vehicle information acquisition request to the at least one service bus.

5. An authentication system comprising:

a processor;

a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in an electronic control unit of the vehicle;

at least one service bus configured to manage transmission and reception of data between the at least one service application and the service manager; and an authorization confirmation unit configured to, when the at least one service application makes a vehicle information acquisition request that requests provision of confidential information among the vehicle information, confirm whether to authorize the vehicle information acquisition request of the confidential information based on whether a user has consented; and a first electronic control unit mounted on the vehicle and including the service manager and the at least one service bus;

wherein:

the authorization confirmation unit is installed in the at least one service bus or in the service manager; and the at least one service application is installed in at least one of a center placed outside the vehicle and configured to communicate data with the first electronic control unit or a second electronic control unit mounted on the vehicle and configured to communicate data with the first electronic control unit.

6. An authentication system comprising:

a processor;

a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in an electronic control unit of the vehicle;

at least one service bus configured to manage transmission and reception of data between the at least one service application and the service manager; and an authorization confirmation unit configured to, when the at least one service application makes a vehicle information acquisition request that requests provision of confidential information among the vehicle information, confirm whether to authorize the vehicle information acquisition request of the confidential information based on whether a user has consented;

a confidential setting storage that stores confidential setting information indicating whether each item of the vehicle information corresponds to the confidential information; and a user consent storage that stores access consent information indicating whether the user consents to access to the confidential information;

wherein:

the authorization confirmation unit is installed in the at least one service bus or in the service manager; and the authorization confirmation unit confirms whether to authorize the vehicle information acquisition request by using the confidential setting information stored in the confidential setting storage and the access consent information stored in the user consent storage.

7. An authentication system comprising:

a processor;

a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in an electronic control unit of the vehicle;

at least one service bus configured to manage transmission and reception of data between the at least one service application and the service manager; and an authorization confirmation unit configured to, when the at least one service application makes a vehicle information acquisition request that requests provision of confidential information among the vehicle information, confirm whether to authorize the vehicle information acquisition request of the confidential information based on whether a user has consented; and a first electronic control unit mounted on the vehicle and including the service manager and the at least one service bus;

wherein:

the authorization confirmation unit is installed in the at least one service bus or in the service manager;

the at least one service application includes a first service application manufactured by a third party and a second service application manufactured by a vehicle manufacturer;

the first electronic control unit includes a hypervisor configured to manage a first virtual machine and a second virtual machine to enable the first virtual machine and the second virtual machine to be executed in parallel on a CPU;

the at least one service bus includes a first service bus and a second service bus;

the first service application and the first service bus are installed in the first virtual machine; and the second service application and the second service bus are installed in the second virtual machine.

8. A relay device that relays data transmitted from an electronic control unit to a communication network of a vehicle, the relay device comprising:

a processor; and a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in a first storage of the relay device or a second storage of the electronic control unit;

at least one service bus configured to manage transmission and reception of data between the at least one service application and the service manager;

an authorization confirmation unit configured to, when the at least one service application makes a vehicle information acquisition request that requests provision of confidential information among the vehicle information stored in the second storage of the electronic control unit or the first storage of the relay device, confirm whether to authorize the vehicle information acquisition request of the confidential information based on whether a user has consented;

a user consent confirmation unit configured to confirm whether the user has consented to the vehicle information acquisition request;

wherein:

the authorization confirmation unit is installed in the at least one service bus;

the authorization confirmation unit confirms with the user consent confirmation unit whether the user has consented to the vehicle information acquisition request when the at least one service application makes the vehicle information acquisition request;

the authorization confirmation unit authorizes the vehicle information acquisition request when the user has consented;

the at least one service application includes a first service application manufactured by a third party and a second service application manufactured by a vehicle manufacturer;

the second service application includes a second authorization confirmation unit configured to confirm whether to authorize the vehicle information acquisition request of the second service application when the second service application makes the vehicle information acquisition request; and the authorization confirmation unit is configured to confirm with the user consent confirmation unit whether the user has consented to the vehicle information acquisition request from the first service application.

9. The relay device according to claim 8, wherein the service manager transmits an instruction to acquire the confidential information from the electronic control unit via the communication network when the authorization confirmation unit confirms that the vehicle information acquisition request of the confidential information is authorized.

10. A relay device that relays data transmitted from an electronic control unit to a communication network of a vehicle, the relay device comprising:

a processor; and a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in a first storage of the relay device or a second storage of the electronic control unit;

at least one service bus configured to manage transmission and reception of data between the at least one service application and the service manager;

an authorization confirmation unit configured to, when the at least one service application makes a vehicle information acquisition request that requests provision of confidential information among the vehicle information stored in the second storage of the electronic control unit or the first storage of the relay device, confirm whether to authorize the vehicle information acquisition request of the confidential information based on whether a user has consented; and a user consent confirmation unit configured to confirm with the user whether the user has consented to the vehicle information acquisition request, wherein:

the authorization confirmation unit is installed in the service manager;

the authorization confirmation unit confirms with the user consent confirmation unit whether the user has consented to the vehicle information acquisition request when the at least one service application makes the vehicle information acquisition request;

the authorization confirmation unit authorizes the vehicle information acquisition request when the user has consented;

the at least one service application includes a first service application manufactured by a third party and a second service application manufactured by a vehicle manufacturer;

the second service application includes a second authorization confirmation unit configured to confirm whether to authorize the vehicle information acquisition request of the second service application when the second service application makes the vehicle information acquisition request; and the authorization confirmation unit is configured to confirm with the user consent confirmation unit whether the user has consented to the vehicle information acquisition request from the first service application.

11. A relay device that relays data transmitted from an electronic control unit to a communication network of a vehicle, the relay device comprising:

a processor;

a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in a first storage of the relay device or a second storage of the electronic control unit;

at least one service bus configured to manage transmission and reception of data between the at least one service application and the service manager; and an authorization confirmation unit configured to, when the at least one service application makes a vehicle information acquisition request that requests provision of confidential information among the vehicle information stored in the second storage of the electronic control unit or the first storage of the relay device, confirm whether to authorize the vehicle information acquisition request of the confidential information based on whether a user has consented;

a confidential setting storage that stores confidential setting information indicating whether each item of the vehicle information corresponds to the confidential information; and a user consent storage that stores access consent information indicating whether the user consents to access to the confidential information, wherein:

the authorization confirmation unit is installed in the at least one service bus or in the service manager; and the authorization confirmation unit confirms whether to authorize the vehicle information acquisition request by using the confidential setting information stored in the confidential setting storage and the access consent information stored in the user consent storage.

12. An authentication system comprising:

a processor;

a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in an electronic control unit of the vehicle;

at least one service bus configured to manage transmission and reception of data between the at least one service application and the service manager; and an authorization confirmation unit configured to, when the at least one service application makes a vehicle information acquisition request that requests provision of confidential information among the vehicle information, confirm whether to authorize the vehicle information acquisition request of the confidential information based on whether a user has consented; and a hypervisor configured to manage a plurality of virtual machines to enable the plurality of virtual machines to be executed in parallel on a CPU;

wherein:

the authorization confirmation unit is installed in the at least one service bus; and the at least one service bus and the at least one service application are installed in at least one of the plurality of virtual machines.

13. An authentication system comprising:

a processor;

a memory coupled to the processor and storing program instructions that when executed by the processor cause the processor to at least serve as:

at least one service application configured to utilize vehicle information related to a vehicle to provide a service to the vehicle;

a service manager configured to acquire the vehicle information stored in an electronic control unit of the vehicle;

at least one service bus configured to manage transmission and reception of data between the at least one service application and the service manager;

an authorization confirmation unit configured to, when the at least one service application makes a vehicle information acquisition request that requests provision of confidential information among the vehicle information, confirm whether to authorize the vehicle information acquisition request of the confidential information based on whether a user has consented; and a user consent confirmation unit configured to confirm whether the user has consented to the vehicle information acquisition request; and a hypervisor configured to manage a first virtual machine and a second virtual machine to enable the first virtual machine and the second virtual machine to be executed in parallel on a CPU;

wherein:

the authorization confirmation unit is installed in the at least one service bus or in the service manager;

the at least one service application includes a first service application manufactured by a third party and a second service application manufactured by a vehicle manufacturer;

the first service application is installed in the first virtual machine;

the second service application is installed in the second virtual machine; and the authorization confirmation unit is configured to confirm with the user consent confirmation unit whether the user has consented to the vehicle information acquisition request from the first service application and the second service application.

* * * * *